United States Patent
Yu et al.

(10) Patent No.: US 11,483,038 B1
(45) Date of Patent: Oct. 25, 2022

(54) SYSTEMS AND METHODS FOR USER GROUPING WITHIN A WIRELESS LOCAL AREA NETWORK (WLAN)

(71) Applicant: NXP USA, Inc., Austin, TX (US)

(72) Inventors: Bo Yu, San Jose, CA (US); Xiayu Zheng, San Jose, CA (US); Yan Zhang, Palo Alto, CA (US); Jinjing Jiang, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 294 days.

(21) Appl. No.: 16/569,269

(22) Filed: Sep. 12, 2019

Related U.S. Application Data (60) Provisional application No. 62/730,357, filed on Sep. 12, 2018.

(51) Int. Cl.
| | |
|---|---|
| *H04B 7/0452* | (2017.01) |
| *H04W 72/12* | (2009.01) |
| *H04B 7/0417* | (2017.01) |
| *H04B 7/06* | (2006.01) |
| *H04W 84/12* | (2009.01) |

(52) U.S. Cl.
CPC ......... *H04B 7/0452* (2013.01); *H04B 7/0417* (2013.01); *H04B 7/0632* (2013.01); *H04W 72/121* (2013.01); *H04W 72/1231* (2013.01); *H04W 84/12* (2013.01)

(58) Field of Classification Search
CPC .. H04B 7/0452; H04B 7/0417; H04B 7/0632; H04W 72/121; H04W 72/1231; H04W 84/12
See application file for complete search history.

(56) References Cited

U.S. PATENT DOCUMENTS

| | | | |
|---|---|---|---|
| 2010/0166097 A1* | 7/2010 | Zhou | H04B 7/0689 375/267 |
| 2018/0199304 A1* | 7/2018 | Wilson | H04W 4/02 |
| 2018/0309553 A1* | 10/2018 | Cao | H04W 72/046 |
| 2020/0245340 A1* | 7/2020 | Zhang | H04W 72/082 |

OTHER PUBLICATIONS

IEEE Std 802.11ac-2013, Part 11: Wireless LAN Medium Access Control (MAC) and Physical Layer (PHY) Specifications, Amendment 4: Enhancements for Very High Throughput for Operation in Bands below 6 GHz. IEEE Computer Society, 2013, 425 pages.

* cited by examiner

*Primary Examiner* — Rhonda L Murphy (57) ABSTRACT

A method for grouping a plurality of client stations in a wireless local area network is disclosed herein. An access point (AP) determines the channel correlation and a distance to the AP for each of the client stations. The AP selects a smaller subset of client stations that meet a threshold requirement determined based on the respective distances between the client stations and the AP.

24 Claims, 4 Drawing Sheets

SYSTEMS AND METHODS FOR USER GROUPING WITHIN A WIRELESS LOCAL AREA NETWORK (WLAN)

CROSS-REFERENCE TO RELATED APPLICATION

This disclosure claims the benefit of U.S. Provisional Patent Application No. 62/730,357, filed Sep. 12, 2018, which is hereby incorporated by reference in its entirety.

FIELD OF USE

This disclosure relates to techniques and devices for grouping client stations for concurrent transmission in a wireless data transmission system. For example, the system may include a wireless local area network (WLAN) implementing an IEEE 802.11 standard, which can be used to provide wireless transfer of data in outdoor deployments, outdoor-to-indoor communications, and device-to-device (P2P) networks.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

Wireless local area networks (WLANs) includes a central access point (AP) connected to a number of client stations (STA) and typically operate in either a unicast mode or a multicast mode. In the unicast mode, the AP transmits information to one client station at a time. In the multicast mode, the same information, such as a packet, is transmitted and concurrently received by two or more client stations. Development of WLAN standards such as the Institute for Electrical and Electronics Engineers (IEEE) 802.11ac and 802.11ax standards has improved data throughput by allowing transmissions and receptions of independent data streams over the same radio frequencies. In such implementations, a group of client stations can share the same bandwidth for data transmission/reception.

When a WLAN has a large number of client stations waiting to be scheduled by the AP for Multi User (MU) Multiple Input Multiple Output (MIMO transmission/reception, the AP must determine how to group the STAs while maximizing data throughput. Specifically, if certain STA channels are highly correlated, the pair of STAs may not be compatible to be grouped for MU-MIMO transmission. Conventionally, only channel state information at the AP is used to determine which STAs can be grouped together (e.g., pair of STAs with low channel correlation values). However, because only channel state information is considered when grouping in conventional WLANs, data throughput for the WLAN may not be maximized.

SUMMARY

Embodiments described herein provide a method for Multi-user (MU) Multiple-Input-Multiple-Output (MIMO) transmission between a plurality of client stations and an access point (AP) including calculating, at the AP, channel correlations for respective channels between the AP and ones of the client stations among the plurality of client stations, determining, at the AP, a respective distance between the AP and each client stations among of the plurality of client stations, selecting, from the plurality of client stations, a smaller subset of client stations based on the determined distances between the AP and the client stations and the respective channel correlation, and allocating for transmission one or more spatial streams to each of the client stations in the selected subset of client stations.

The method for MU-MIMO transmission further includes obtaining the channel correlation for respective channels between the AP and each of the plurality of client stations by transmitting, from the AP, a sounding packet to each of the client stations among the plurality of client stations; receiving, at the AP, respective feedback information indicative of channel quality information from each of the plurality of client stations; and calculating the respective channel correlation for each of the plurality of channels based on the received feedback information.

The method for MU-MIMO transmission further includes obtaining the channel correlation for each of the channels between the AP and each of the plurality of client stations by determining, at the AP, the estimated channel between the AP and the plurality of client stations based on respective single-user (SU) transmissions from each of the plurality of client stations to the AP; and calculating channel correlation for each of the plurality of client stations based on the respective channel estimated by the AP.

The method for MU-MIMO transmission to further includes determining the respective distances between the AP and each of the plurality of client stations by transmitting, from the AP, a sounding packet to each of the plurality of client stations; receiving, at the AP, respective feedback information indicative of channel quality information from each of the plurality of client stations; extracting, from the received feedback information, a Signal-to-Noise Ratio (SNR) value at the respective client stations indicative of received signal strength information (RSSI); and estimating, at the AP, the distance between the AP and each of the plurality of client stations based on the corresponding SNR value.

The method for MU-MIMO transmission further includes selecting, from the plurality of client stations, the subset of client stations based on the determined distances between the AP and the client stations and the respective channel correlation by determining a respective channel correlation threshold value based on the distance between the AP and the client stations; comparing the channel correlation value for each of plurality of client stations to the determined channel correlation threshold; and identifying a second subset of client stations corresponding to channel correlation determined to be lower than the determined channel correlation threshold.

The method for MU-MIMO transmission further includes comparing the channel correlation for each of plurality of client stations to a predetermined threshold by determining the channel correlation threshold based on the determined distance between the AP and the respective client stations, where the determined threshold for the channel correlation is set to be lower for a client station positioned at a first distance from the AP, and the predetermined threshold for the channel correlation is set to be higher for a client station positioned at a second distance from the AP that is less than the first distance.

The method for MU-MIMO transmission further includes selecting, from the identified second subset of client stations, a first client station based on a predefined metric, where the predefined metric is one of a respective SU transmission rates corresponding to each of the client stations included in the second subset or an expiration time of a packet to be transmitted to the AP corresponding to each of the client stations included in the second subset, or the queuing time of packets at the AP to be transmitted to each of the client stations included in the second subset.

The method for MU-MIMO transmission further includes, for each of the client stations other than the first client station included in the second subset, determining a number of spatial streams of the client station; determining whether a sum of the number of spatial streams allocated to the selected first client station and the number of spatial streams of the client station other than the first client station exceeds a maximum number of allowable spatial streams at the AP; and in response to determining that the sum of spatial streams exceeds the maximum number of permissible spatial streams, removing the client station other than the first client station having the same or larger number of spatial streams as the client station from the second subset.

The method for MU-MIMO transmission further includes, in response to determining that the sum of spatial streams does not exceed the maximum number of allowable streams, determining whether channel correlation for any of the spatial streams of the client station exceeds a predetermined threshold; and in response to determining that the channel correlation for any of the spatial streams of the client station does not exceed the predetermined threshold, adding the client station to a third subset.

Embodiments are also described herein for a wireless access point system for Multi-user (MU) Multiple-Input-Multiple-Output (MIMO) transmission between a plurality of client stations and an access point (AP). The system includes control circuitry configured to calculate channel correlations for respective channels between the AP and ones of the client stations among the plurality of client stations; determine a respective distance between the AP and each client stations among of the plurality of client stations; select, from the plurality of client stations, a smaller subset of client stations based on the determined distances between the AP and the client stations and the respective channel correlation; and allocate for transmission one or more spatial streams to each of the client stations in the selected subset of client stations.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for grouping client stations (STAs) within an 802.11 (e.g., 802.11ac, 802.11ax) wireless network. More particularly, in a multi-user (MU) system, an access point (AP) makes a grouping determination from a plurality of client stations waiting to be scheduled based on channel state information and distance to the AP. As discussed above, conventional designs only consider channel state information when deciding to group STAs. For example, the AP calculates channel correlation values and compares them to a threshold value. If the calculated channel correlation value is lower than the threshold value, the AP selects the STAs to be grouped together for MU transmission. However, one drawback of such systems is that the channel correlation values are compared against a single threshold correlation value. Specifically, STAs that are positioned closer to the AP have high throughput even when the STAs are highly correlated. Similarly, STAs that are positioned further away from the AP may provide a lower throughput even when the STAs are not highly correlated. A single correlation threshold is therefore both too conservative (for STAs located close to the AP) and too liberal (for STAs located far away from the AP).

Methods and systems described here provide a mechanism grouping STAs based on both channel state information and respective distances between the AP and the STAs. Specifically, the AP computes channel state information for each of the respective channels between the AP and the STAs. The AP further determines a respective distance between the AP and the STAs. Based on the determined distances, the AP identifies a corresponding correlation threshold with which the channel correlation value for the STAs is compared to. That is, the AP can tolerate a higher channel correlation when the STA is located closer to the AP. Therefore, the channel correlation value for a STA located closer to the AP is compared to a higher channel correlation threshold value. Similarly, the channel correlation value for a STA located far away from the AP is compared to a lower channel correlation threshold value since the AP can tolerate a lower channel correlation threshold. The AP then selects the STAs having a channel correlation value lower than the respective correlation threshold determined based on the distance to the AP.

Figure 1:
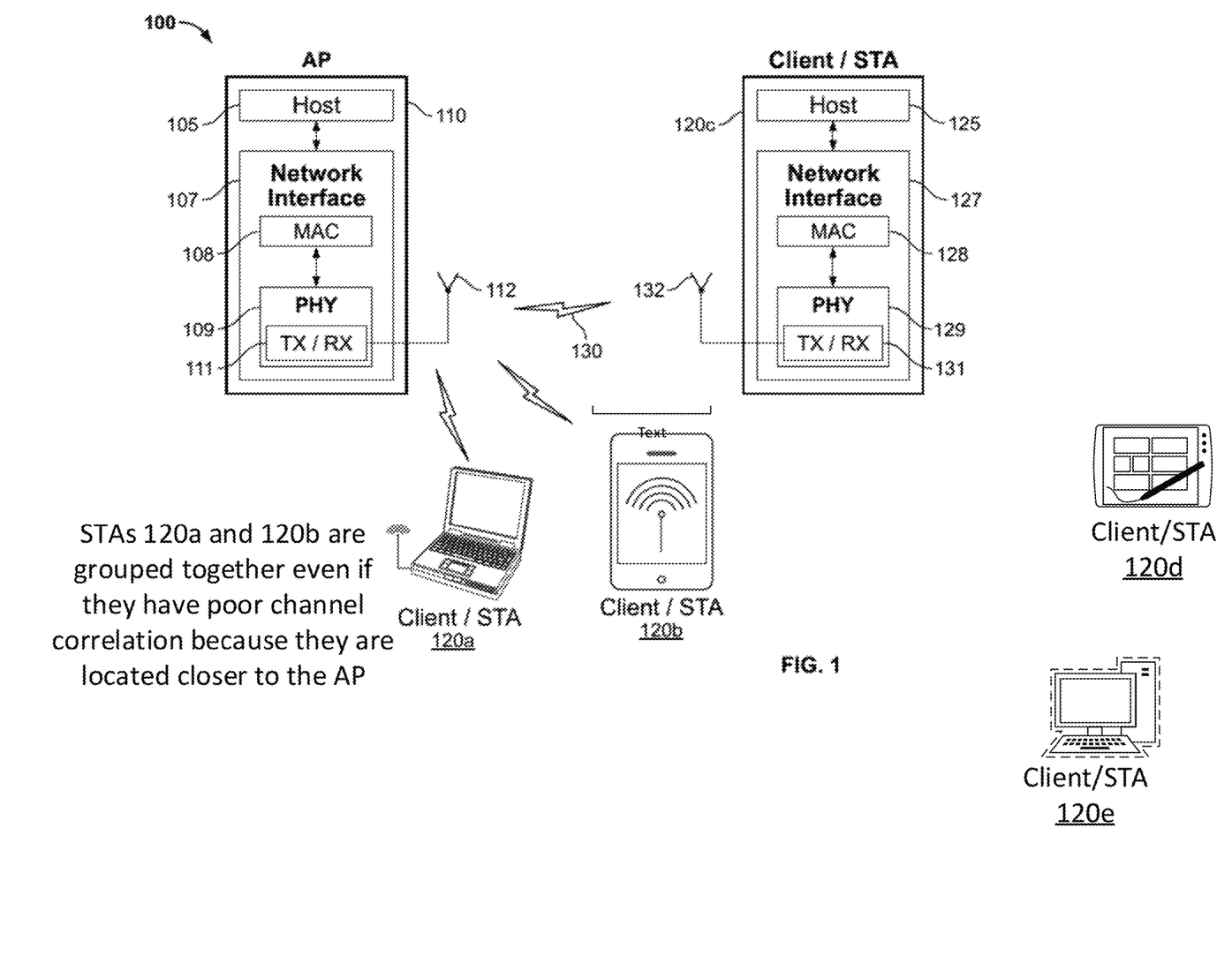
FIG. 1 is a block diagram of an example wireless WLAN 100 in which the STAs can be grouped, according to some embodiments described herein.
Figure 2:
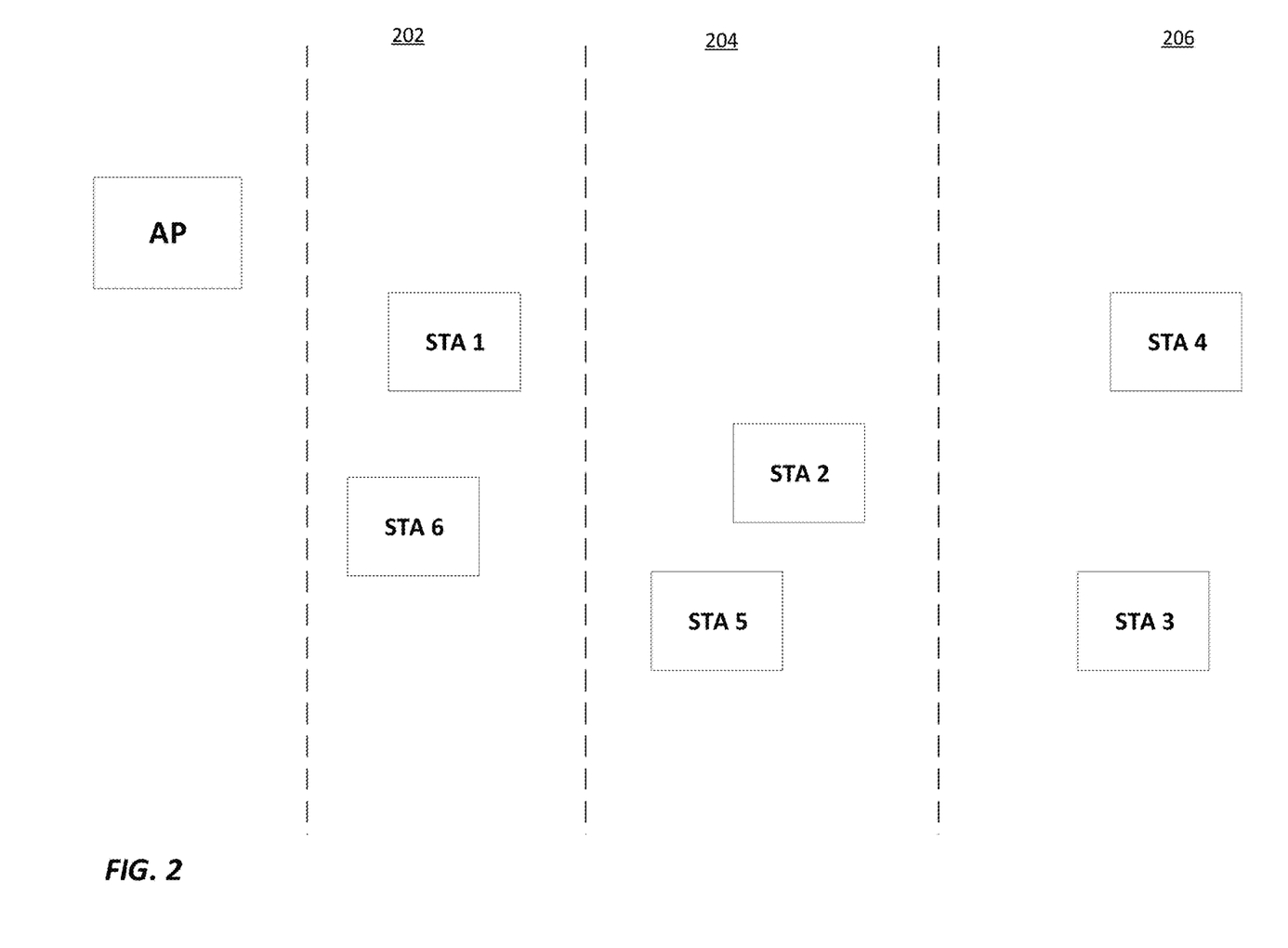
FIG. 2 is a block diagram of an example wireless WLAN 200 illustrating positioning of the STAs relative to the AP, according to some embodiments described herein.
Figure 3:
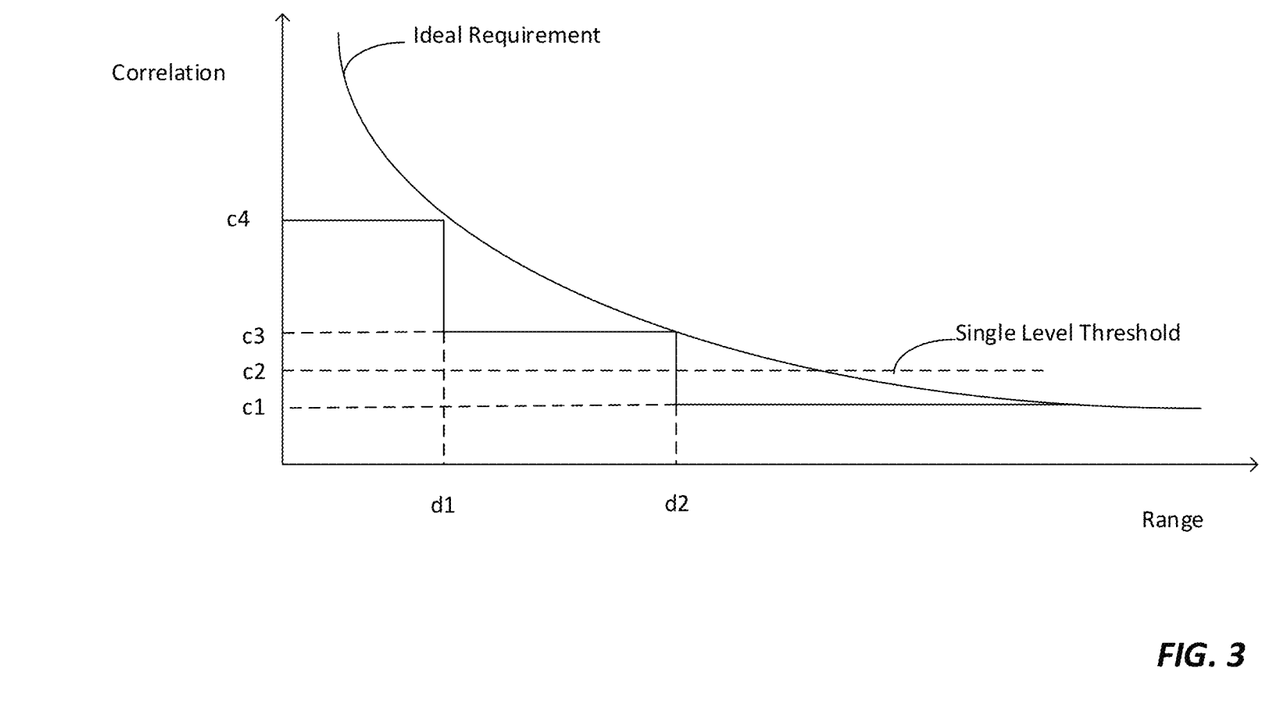
FIG. 3 is an example graphical illustration of an ideal threshold requirement for grouping STAs, according to some embodiments described herein.

FIG. 1 is a block diagram of an example wireless WLAN 100 that the client station grouping mechanism can be operated within, according to some embodiments described herein. A wireless AP 110 (access point) includes a host processor 105 (host control circuitry) that may be configured to process or assist in data operation, such as modulation/demodulation, encoding/decoding, encryption/decryption, or the like. For example, the host processor 105 of an AP, in accordance with an implementation, is configured to group client stations for data transmission, as illustrated in FIGS. 2 and 3.

A network interface circuitry 107 is coupled to the host processor 105, which is configured to interface with a plurality of client stations. The network interface circuitry 107 includes a medium access control (MAC) processing unit 108 and a physical layer (PHY) processing unit 109. The PHY processing unit 109 includes a plurality of transceivers 111, and the transceivers 111 are coupled to a plurality of antennas 112 (for simplicity only one is shown).

The WLAN 100 includes a plurality of client stations 120a-e. Although three client stations 120a-e are illustrated in FIG. 1, the WLAN 100 can include different numbers (e.g., 1, 2, 3, 5, 6, etc.) of client stations 120a-e in various scenarios and embodiments. Each client station, e.g., 120a-e, may have a similar structure as that of an AP 110 (access point). For example, the client station 120c seen in FIG. 1 includes a host processor 125 (host control circuitry)

coupled to a network interface circuitry 127. The network interface circuitry 127 includes a MAC processing unit 128 and a PHY processing unit 129. The PHY processing unit 129 includes a plurality of transceivers 131, and the transceivers 131 are coupled to a plurality of antennas 132 (for simplicity only one is shown) to receive or transmit data from or to the wireless communication channel.

Two or more of the client stations 120a-e may be configured to receive data such as including an 802.11 data frame 130, which may be transmitted concurrently by the AP 110 (access point). Additionally, two or more of the client stations 120a-c can be configured to transmit data to the AP 110 (access point) such that the AP 110 receives the data.

In some implementations, the wireless AP 110 calculates the channel state information by performing a sounding procedure. The initial sounding mode is executed to sound the channels without targeting any specific group. The sounding could be in the form of a null data packet (NDP) dedicated for sounding or it could be accomplished as part of a MU downstream data packet. In this stage, the packets are not beamformed or pre-coded, and the AP requests the channel state information from the stations. In response to the initial sounding from the access point (AP), the stations (STAs) send back to the AP channel state information (CSI) to the AP. Then, the AP uses the CSI from each of the STAs to determine the group definitions and informs STAs of the group membership.

In order to improve the performance in a MU-MIMO system, the AP first performs an initial sounding by sending a sounding packet to a large number of stations. These stations may be all or part of the stations within the range covered by the AP. The stations that receive the sounding packet send a respond to the AP. The AP obtains channel state information (CSI) from the responses and calculates channel correlation for the STAs.

A Very High Throughput (VHT) sounding sequence, for example, in accordance with the 802.11ac standard, involves the AP 110 sending a VHT NDP announcement and periodically receiving responses from the STAs. Similarly, in a High Efficiency (HE) trigger-based sounding sequence, in accordance with the 802.11ax standard, the AP 110 transmits a HE NDP announcement to the plurality of client stations. In response to receiving the HE NDP announcement from the AP 110, the STAs calculate CQI and transmit the channel information to the AP 110. The AP 110 then calculates the channel correlations based on the received CQI for the respective channels.

In some implementations, the AP 110 estimates the channel information based on the single user (SU) transmissions from the STAs to the AP 110 in the uplink direction. The AP 110 uses the estimated channel for correlation calculation. The AP 110 needs to perform channel normalization when estimating channel information based on the SU transmission to have unity magnitude.

The AP 110 further determines the distances at which the various STAs are located relative to the AP 110. Specifically, in an embodiment, the AP 110 determines the received power level, or other suitable techniques, to estimate the ranges. For downlink (DL) MU-MIMO, the AP 110 needs to know received signal strength (RSSI) at the STAs. In some implementations, the AP 110 uses the sounding feedback (received in response to sending an NDP) to estimate the RSSI. Specifically, the sounding feedback from the STAs includes an average signal to noise ratio (SNR) value in the VHT/HE compressed beamforming report. In some implementations, the AP 110 uses uplink (UL) RSSI at the AP 110 for uplink packets from STAs for approximation. However, the approximation may not be sufficiently accurate due to potential differences in the power at the AP and the respective STAs. For UL MU-MIMO, RSSI for uplink SU packets from STAs is readily available at the AP 110. For example, in the embodiment seen in FIG. 1, the AP 110 determines that STAs 120a-c are in a near range while STAs 120d and 120e are in far range based on the respective RSSI information.

Once the AP 110 calculates the channel correlation and distances to the STAs, the AP 110 begins grouping the STAs based on channel correlation. In conventional WLANs, STAs 120a-c may not be grouped together due to poor channel correlation. However, methods and systems described herein account for higher data throughput due to the proximity of the STAs 120a-c to the AP 110 and therefore applies a higher channel correlation threshold when making the grouping decision. For a station k on tone i, the channel is $h_{ki}$ with dimension $N_r \times N_{ss}^k$, where $N_r$ is the number of receive antennas and $N_{ss}^k$ is the number of spatial streams for station k. To form a new group from a set of STAs, the AP 110 initially filters out STAs with poor channel correlations.

Specifically, for each active STA k (i.e., a STA having a data packet waiting to be transmitted to the AP) with more than one streams to be grouped, the AP 110 compares the calculated channel correlation to a threshold. For example, if $N_{ss}^k=2$: the AP 110 calculates $Corr_2 = \Sigma_{i \in T} |\langle h_{ki}(:,0), h_{ki}(:,1) \rangle|$ where T is the set of tones selected for calculation and checks whether the correlation value $Corr_2$ is less than the threshold requirement for 3 streams $TH_3$.

Next, the AP 110 chooses the first STA s1 obtained from the filtered set of STAs based on a predetermined metric. In some implementations, the predetermined metric is defined by the amount of traffic at the respective STAs. That is, the AP 110 selects the first STA s1 having the largest amount of traffic. In some implementations, the predetermined metric is defined by waiting time at the respective STAs. Specifically, the AP 110 requests queue information from each of the STAs and selects the first STA s1 having the longest wait time. A person skilled in the art will understand that any number of various predetermined metrics may be used to select the first STA s1 from the filtered set of STAs. Once STA s1 is selected, the selected STAs set $S=\{s1\}$ is updated.

Once the first STA s1 is selected (e.g., STA 120a in FIG. 1, the AP 110 chooses the $n^{th}$ STA among qualified STAs (denoted by set K) within the subset. For each STA k with $N_{ss}^k$ streams and $N_{ss}^p + N_{ss}^k$ is less than the maximum allowable streams, the AP 110 first checks whether the correlations for the already selected STAs in set S satisfy the new threshold $TH_{N_{ss}^p+N_{ss}^k}$, where $N_{ss}^p$ is the total number of streams for set S. That is, the AP 110 determines whether the number of spatial streams already allocated to the stations in the selected STAs set S combined with the number of streams for station k exceeds the maximum number of spatial streams available to be allocated (i.e., based on a number of receivers at the AP 110).

If it is determined that the threshold is exceeded, STAs with the same or larger number of streams are not considered to be added to the group and the AP 110 continues to check STAs with a smaller number of streams, in accordance with some implementations. If, on the other hand, the threshold is not exceeded, the AP 110 continues to check whether the new STA satisfies the correlation requirement.

That is, when the number of spatial streams is 1 ($N_{ss}^k=1$), the AP 110 calculates the channel correlation $$\mathrm{Corr}_{k1} = \sum_{i \in T} \max_{t \in S, l \in [0, N_{ss}^t - 1]} |\langle h_{ti}(:, l), h_{ki}(:, 0) \rangle|$$

and checks it against the threshold $\mathrm{TH}_{N_{ss}^P+1}$. If the correlation requirement is met, the AP 110 sets $\mathrm{Corr}_k = \mathrm{Corr}_{k1}$. Otherwise, the STA is excluded from further consideration.

Similarly, when the number of spatial streams is 2, the AP 110 first checks $\mathrm{Corr}_{kl}$ against the threshold $\mathrm{TH}_{N_{ss}^P+2}$. If the threshold requirement is met, the AP 110 continues to check $$\mathrm{Corr}_{k2} = \sum_{i \in T} \max \left\{ \max_{t \in S, l \in [0, N_{ss}^t - 1]} |\langle h_{ti}(:, l), h_{ki}(:, 1) \rangle|, |\langle h_{ki}(:, 0), h_{ki}(:, 1) \rangle| \right\}$$

against $\mathrm{TH}_{N_{ss}^P+2}$. If the threshold condition is met, the AP 110 sets $\mathrm{Corr}_k = \max\{\mathrm{Corr}_{k1}, \mathrm{Corr}_{k2}\}$. Otherwise, the STA is excluded from further consideration.

The AP 110 then calculates the number of STAs M which satisfy the correlation requirements described above. If there are more than 2 STAs which satisfy the above correlation requirements (i.e., M>2), the AP 110 finds the STA with the minimum correlation:

$$s_n = \underset{k \in K}{\mathrm{argmin}}\, \mathrm{Corr}_k,$$

and update $S = S \cup \{S_n\}$. If there are two stations that satisfy the above correlation requirements (i.e., M=2), and the two STAs cannot be added to the same group (e.g., due to poor correlation), the AP 110 picks the STA with the larger number of streams to be grouped, in accordance with some implementations.

Additionally, the AP 110 checks whether the total number of streams in set S is less than the maximum allowable streams. If yes, the AP 110 repeats the above steps to find additional STAs to group together. If, on the other hand, the total number of streams in set S is more than the maximum allowable streams, the process stops. The AP 110 then allocates the available number of spatial streams to the STAs in subset S. Finally, the AP 110 sets the order of the STAs in the set S. In accordance with 802.11ax, the AP 110 rearranges the STAs in a SIG-B portion for DL MU-MIMO in a decreasing order of spatial streams $N_{ss}^k$. Although 802.11ac does not set forth any requirements for STA ordering, in some implementations, the AP 110 similarly orders the STAs in set S based on a decreasing order of spatial streams $N_{ss}^k$.

As noted above, the AP 110 calculates cross correlation values for each STA. Specifically, assuming the channels $h_1 = [h_{11}, \ldots, h_{1N}]$ and $h_2 = [h_{21}, \ldots, h_{2N}]$, then the AP 110 calculates the correlation $\langle h_1, h_2 \rangle$ using the following equation: $\langle h_1, h_2 \rangle = h_1 \cdot h_2 = \sum_{n=1}^{N} h_{1n} \cdot h^*_{2n}$. In some embodiments, when calculating channel correlation, in order to reduce computational complexity, the AP 110 only performs the correlation calculation on some of the tones. Generally, by using more tones for calculating channel correlation, the AP 110 is able to achieve a more accurate channel correlation. However, conversely, in order to reduce computational overload, the AP 110 selects one of every four tones for computing the channel correlation in some embodiments. In some implementations, the AP 110 selects one of every sixteen tones for computing the channel correlation.

Moreover, the AP 110 compares the calculated correlation to a respective threshold based on the ranges of the STAs. As seen in the embodiment of FIG. 2, the area serviced by the AP 110 may be partitioned into three areas —near region 202, intermediate region 204, and far region 206 —based on calculated RSSI values. Each of the regions 202, 204, and 206 have a corresponding correlation threshold requirement. For example, far range 206 has the tightest requirement, followed by intermediate range 204, and the near range 202. Moreover, in some implementations, within each range, the threshold could be variable based on total number of streams to be grouped. Generally, the higher the number of streams, the tighter the threshold. An example table for thresholds is shown below with: $a_i > b_i > c_i$, $\forall i \in \{1, 2, 3\}$, and $x_3 > x_2 > x_1$, $\forall x \in \{a, b, c\}$

TABLE 1

| | Near | Intermediate | Far |
|---|---|---|---|
| Nss ≥ 4 | $a_1$ | $b_1$ | $c_1$ |
| Nss = 3 | $a_2$ | $b_2$ | $c_2$ |
| Nss = 2 | $a_3$ | $b_3$ | $c_3$ |

It is noted that the area serviced by the AP 110 may be partitioned into any number of regions (and corresponding threshold values).

FIG. 3 is an example graphical illustration of an ideal threshold requirement for grouping STAs, according to some embodiments described herein. Specifically, as shown in FIG. 3, the ideal requirement curve shows that the correlation threshold is higher as the distance between the AP 110 and the STAs decreases. As discussed above, conventional designs use a single level threshold (represented by the dotted line) and therefore omit STAs with poorer channel correlation that are located closer to the AP 110. For example, a STA located at distance dl and having a correlation c4 would not be considered for grouping under conventional design because the correlation value c4 is higher than the single level threshold. However, in accordance with methods and systems described herein, the STA will be considered for grouping because of the short distance to the AP 110 resulting in higher throughput despite the poor channel correlation.

Once the AP 110 groups the STAs based on the distances to the AP 110 and the channel correlation, the groups that are formed are used until a re-grouping condition is triggered. For example, in some implementations, regrouping is triggered in response to channel conditions worsening or a change in the traffic status at the STAs. In some implementations, when the modulation and coding scheme (MCS) drops to a low level, the STA is removed from the group. In some implementations, when a STA from an existing group does not have traffic for a certain amount of time, the STA is removed from the group.

When the STAs are located in different ranges, the AP 110 nevertheless groups them together as long as the correlation requirement is met. Specifically, in some implementations, the AP 110 uses the threshold for near range STA. Although this threshold level may degrade the performance of far range STAs, the total throughput for grouping the near range STAs and far range STAs is still larger than the un-grouping.

In some implementations, the AP 110 uses the threshold for far range STA. Although this threshold level excludes some near range STAs from consideration, the AP 110 protects the far range STAs from degradation after grouping.

However, the total throughput is less than optimal due to exclusion of near range STAs with higher correlation.

In some implementations, in order to reduce the complexity for correlation computation, especially when the number of candidate STAs is very large, the AP 110 first selects a subset of active users or an already existing user group based on certain utility metric (such as round robin, or proportional fairness) for each MU-MIMO scheduling round. The total number of streams for STAs in the subset can be predefined and configurable depending on the AP configurations to further limit the number of correlation calculations.

In some implementations, the AP 110 gives preference to selection of STAs within a certain RSSI range for both UL and DL. For example, when $RSSI_0$ is the RSSI of the STA with the largest utility metric, the AP 110 selects STAs in descending order of the utility metric that satisfy: $|RSSI_i - RSSI_0| \leq \delta_1$ ($\delta_1$ is configurable, for example 15 dB), until the total number of streams is reached. If the total number of streams cannot be reached with $\delta_1$, the AP 110 increases $\delta_1$ by a small step (such as 5 dB) to achieve this. The mean RSSI of the selected STAs is used for correlation threshold selection later, in accordance with some embodiments.

In some implementations, based on the selected STA subset, AP 110 conducts the correlation-based STA grouping. As soon as one group is formed, the correlation computation process is terminated. If no user group is formed, the AP 110 returns to re-select the STA subset. This STA subset selection process before correlation calculation greatly reduces the number of calculations in order to form a MU-MIMO group.

Moreover, the AP 110 recognizes that not all STAs are suitable for MUMIMO operation, especially for STAs with large number of streams. The AP 110, in some implementations, restricts STAs with large number of streams from being grouped without compromising system throughput performance. For example, AP 110 group STAs with only 1 or 2 streams in some implementations. In some embodiments, the AP 110 restricts the number of 2-stream STAs to be grouped since for AP with few antennas (e.g., 4), it is better not to have more than one 2-stream STA grouped. Moreover, the AP 110 also sets a limit for the total number of streams that can be grouped for a given AP configuration in some implementations.

Figure 4:
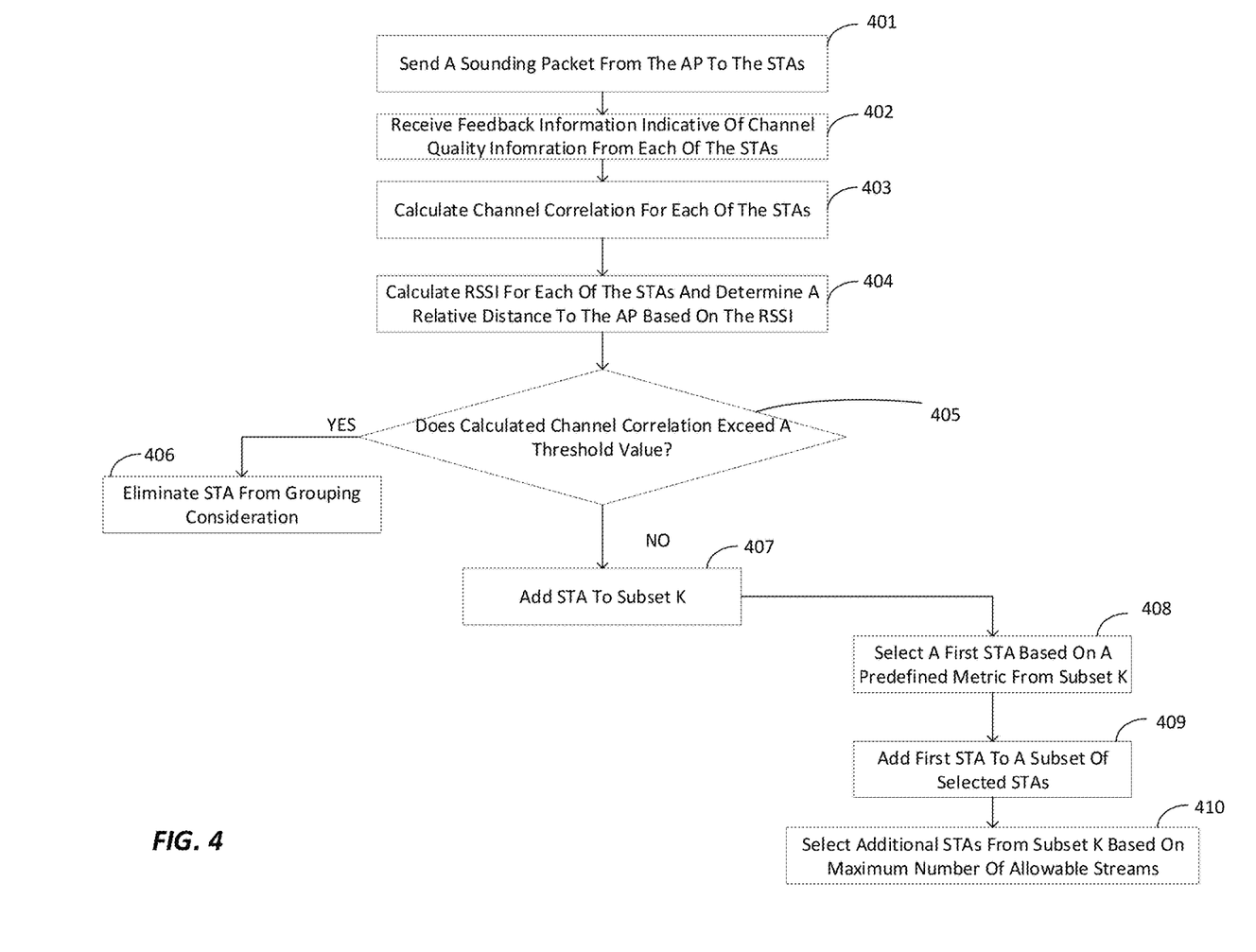
FIG. 4 is an example flow diagram illustrating an example method for grouping STAs in a wireless local area network (WLAN), according to some embodiments described herein.

FIG. 4 is a flow diagram illustrating aspects of grouping STAs together, according to an example embodiment described herein. At 401, the AP begins the sounding process. Specifically, the AP sends out a sounding packet (e.g., null data packet) to each of the STAs having traffic. At 402, the AP receives sounding feedback having information related to the channel quality information (CQI) from each of the STAs in response to the sounding packet. Based on the received CQI from each of the STAs, the AP calculates channel correlations for each of the STAs at 403.

At 404, the AP calculates the received signal strength information (RSSI) for each of the STAs to determine a distance between the AP and the STA. It is noted that the AP may use any suitable technique for estimating the distance between the AP and the STAs. For example, the AP determines that a STA having a high RSSI is located closer to the AP than a STA having a low RSSI. At 405, the AP determines whether the calculated channel correlation exceeds a threshold value. As discussed above, the threshold values are set based on the distances. Specifically, the channel correlation threshold is set to be higher for STAs located closer to the AP while the channel correlation threshold is set to be lower for STAs positioned further away from the AP.

If at 405, the AP determines that the channel correlation for a STA is higher than its corresponding threshold, the method proceeds to 406 and the STA is eliminated from grouping consideration. If, on the other hand, the AP determines that the channel correlation for a STA is lower than its corresponding threshold, the method proceeds to 407 and the STA is added to a subset K.

Next, at 408, the AP selects a first STA from the subset K of stations meeting the channel correlation threshold requirement. For instance, in some embodiments, the AP selects a first STA from subset K based on a waiting time for the traffic at each of the STAs within the subset K. At 409, the AP adds the selected first STA to a second subset of selected STAs S. At 410, the AP selects additional STAs from subset K to be added to subset S based on the number of spatial streams available at the AP and the number of spatial streams already allocated to the stations in subset S. That is, the AP compares the total number of spatial streams assigned to the stations in subset S and compares it to the maximum number of allowable streams at the AP. If the total number of spatial streams assigned to the stations in subset S is lower than the maximum number of allowable streams at the AP, the AP searches for additional STAs within subset K to be added to subset S. In this way, methods and systems disclosed herein are able to account for distances and channel correlations when making a grouping decision to maximize throughput. Once the selected STAs are added to subset S, the AP allocates the available spatial streams to each of the STAs in subset S for transmissions/receptions of data packets.

While this specification contains many specifics, these are not to be construed as limitations on the scope of what may be claimed, but, rather, as descriptions of particular implementations of the subject matter.

While operations are depicted in the drawings in a particular order, this should not be understood as requiring that such operations be performed in the particular order shown or in sequential order, or that all illustrated operations be performed, to achieve the desirable results. In certain circumstances, multitasking and parallel processing may be advantageous.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method for Multi-user (MU) Multiple Input Multiple-Output (MIMO) transmission between a plurality of client stations and an access point (AP) comprising:

calculating, at the AP, channel cross correlations wherein each cross correlation is calculated between respective channels associated with two client stations of the plurality of client stations, a channel being between one of the client stations and the AP;

determining, at the AP, a respective relative distance between the AP and each client station of the plurality of client stations indicative of a closeness between the AP and the particular client station, wherein the relative distance between the AP and a particular client station is specified by a power level of a received signal from the particular client station;

selecting, from the plurality of client stations, a smaller subset of the plurality of client stations based on the determined relative distances between the AP and each of the client stations and the channel cross correlations, wherein a selected station in the subset has a channel cross correlation based on a channel associated with the selected client station which is less than a channel correlation threshold value, wherein the channel correlation threshold value is a specific channel cross correlation value, the channel correlation threshold value determined by the relative distance between the AP and the selected client station and a function of channel cross correlation values versus relative distances, wherein the channel cross selection values in the function vary inversely to the relative distances; and allocating for transmission one or more spatial streams to each of the client stations in the selected subset of client stations.

2. The method for MU-MIMO transmission according to claim 1, wherein obtaining the channel correlation for respective channels between the AP and each of the plurality of client stations comprises:

transmitting, from the AP, a sounding packet to each of the client stations among the plurality of client stations;

receiving, at the AP, respective feedback information indicative of channel quality information from each of the plurality of client stations; and calculating the respective channel correlation for each of the plurality of channels based on the received feedback information.

3. The method for MU-MIMO transmission according to claim 1, wherein obtaining the channel correlation for each of the channels between the AP and each of the plurality of client stations comprises:

determining, at the AP, an estimated channel between the AP and the plurality of client stations based on respective single-user (SU) transmissions from each of the plurality of client stations to the AP; and calculating channel correlation for each of the plurality of client stations based on the respective channel estimated by the AP.

4. The method for MU-MIMO transmission according to claim 1, wherein determining the respective relative distances between the AP and each of the plurality of client stations comprises:

transmitting, from the AP, a sounding packet to each of the plurality of client stations;

receiving, at the AP, respective feedback information indicative of channel quality information from each of the plurality of client stations;

extracting, from the received feedback information, a Signal-to-Noise Ratio (SNR) value at the respective client stations indicative of received signal strength information (RSSI); and estimating, at the AP, the relative distance between the AP and each of the plurality of client stations based on the corresponding SNR value.

5. The method for MU-MIMO transmission according to claim 1, wherein selecting, from the plurality of client stations, the subset of client stations based on the determined relative distances between the AP and the client stations and the respective channel correlation comprises:

determining a respective channel correlation threshold value based on the relative distance between the AP and the client stations;

comparing the channel correlation value for each of plurality of client stations to the determined channel correlation threshold; and identifying a second subset of client stations corresponding to channel correlation determined to be lower than the determined channel correlation threshold.

6. The method for MU-MIMO transmission according to claim 5, wherein comparing the channel correlation for each of plurality of client stations to a predetermined threshold comprises:

determining the channel correlation threshold based on the determined relative distance between the AP and the respective client stations;

wherein the determined threshold for the channel correlation is set to be lower for a client station positioned at a first relative distance from the AP; and the predetermined threshold for the channel correlation is set to be higher for a client station positioned at a second relative distance from the AP that is less than the first relative distance.

7. The method for MU-MIMO transmission according to claim 5, further comprising:

selecting, from the identified second subset of client stations, a first client station based on a predefined metric;

wherein the predefined metric is one of respective SU transmission rates corresponding to each of the client stations included in the second subset or an expiration time of a packet to be transmitted to the AP corresponding to each of the client stations included in the second subset or a queuing time of packets at the AP to be transmitted to each of the plurality of client stations included in the second subset.

8. The method for MU-MIMO transmission according to claim 7, further comprising:

for each of the client stations other than the first client station included in the second subset:

determining a number of spatial streams of the client station;

determining whether a sum of the number of spatial streams allocated to the selected first client station and the number of spatial streams of the client station other than the first client station exceeds a maximum number of allowable spatial streams at the AP; and in response to determining that the sum of spatial streams exceeds the maximum number of permissible spatial streams, removing the client station other than the first client station having the same or larger number of spatial streams as the client station from the second subset.

9. The method for MU-MIMO transmission according to claim 8, further comprising:

in response to determining that the sum of spatial streams does not exceed the maximum number of allowable streams:

determining whether channel correlation for any of the spatial streams of the client station exceeds a predetermined threshold; and in response to determining that the channel correlation for any of the spatial streams of the client station does not exceed the predetermined threshold: adding the client station to a third subset.

10. The method for MU-MIMO transmission according to claim 9, further comprising:

determining whether the number of client stations in the third subset exceeds a predetermined number; and in response to determining that the number of client stations in the third subset exceeds a predetermined number:
selecting client stations from the third subset to be grouped with the first client station based on the respective channel correlation.

11. The method of claim 1, wherein the power level is based on a received signal strength of the signal received by the particular client station.

12. The method of claim 1, wherein the channel correlation threshold value is the channel correlation of the function which maps to the relative distance between the AP and the selected client station.

13. A system for Multi-user (MU) Multiple-Input-Multiple-Output (MIMO) transmission between a plurality of client stations and an access point (AP) comprising:
Control circuitry configured to:
calculate channel cross correlations wherein each cross correlation is calculated between respective channels associated with two client stations of the plurality of client stations, a channel being between one of the client stations and the AP;
determine a respective relative distance between the AP and each client stations among of the plurality of client stations indicative of a closeness between the AP and the particular client station, wherein the relative distance between the AP and a particular client station is specified by a power level of a received signal from the particular client station;
select, from the plurality of client stations, a smaller subset of the plurality of client stations based on the determined relative distances between the AP and each of the client stations and the channel cross correlations, wherein a selected client station in the subset has a channel cross correlation based on a channel associated with the selected client station which is less than a channel correlation threshold value, wherein the channel correlation threshold value is a specific channel cross correlation value, the channel correlation threshold value determined by the relative distance between the AP and the selected client station and a function of channel cross correlation values versus relative distances, wherein the channel cross correlation values in the function vary inversely to the relative distances; and
allocate for transmission one or more spatial streams to each of the client stations in the selected subset of client stations.

14. The system for MU-MIMO transmission according to claim 13, wherein the control circuitry, when obtaining the channel correlation for respective channels between the AP and each of the plurality of client stations, is further configured to:
transmit a sounding packet to each of the client stations among the plurality of client stations;
receive, at a receiver of the AP, respective feedback information indicative of channel quality information from each of the plurality of client stations; and
calculate the respective channel correlation for each of the plurality of channels based on the received feedback information.

15. The system for MU-MIMO transmission according to claim 13, wherein the control circuitry, when obtaining the channel correlation for each of the channels between the AP and each of the plurality of client stations, is further configured to:
estimate channel for each of the channels between the AP and the plurality of client stations based on respective single-user (SU) transmissions from the AP to the client stations; and
calculate channel correlation for each of the plurality of client stations based on the respective channel estimated by the AP.

16. The system for MU-MIMO transmission according to claim 13, wherein the control circuitry, when determining the respective relative distances between the AP and each of the plurality of client stations, is further configured to:
transmit, from the AP, a sounding packet to each of the plurality of client stations;
receive, at the AP, respective feedback information indicative of channel quality information from each of the plurality of client stations;
extract, from the received feedback information, a Signal-to-Noise Ratio (SNR) value at the respective client stations indicative of received signal strength information (RSSI); and
estimate the relative distance between the AP and each of the plurality of client stations based on the corresponding SNR value.

17. The system for MU-MIMO transmission according to claim 13, wherein the control circuitry, when selecting, from the plurality of client stations, the subset of client stations based on the determined relative distances between the AP and the client stations and the respective channel correlation, is further configured to:
determine a respective channel correlation threshold value based on the relative distance between the AP and the client stations;
compare the channel correlation value for each of plurality of client stations to the determined channel correlation threshold; and
identify a second subset of client stations corresponding to channel correlation determined to be lower than the determined channel correlation threshold.

18. The system for MU-MIMO transmission according to claim 17, wherein the control circuitry, when comparing the channel correlation for each of plurality of client stations to a predetermined threshold, is further configured to:
determine the channel correlation threshold based on the determined relative distance between the AP and the respective client stations;
wherein the determined threshold for the channel correlation is set to be lower for a client station positioned at a first relative distance from the AP; and
the predetermined threshold for the channel correlation is set to be higher for a client station positioned at a second relative distance from the AP that is less than the first relative distance.

19. The system for MU-MIMO transmission according to claim 17, wherein the control circuitry is further configured to:
select, from the identified second subset of client stations, a first client station based on a predefined metric;
wherein the predefined metric is one of respective SU transmission rates corresponding to each of the client stations included in the second subset or an expiration time of a packet to be transmitted to the AP corresponding to each of the client stations included in the second subset or a queuing time of packets at the AP to be transmitted to each of the plurality of client stations included in the second subset.

20. The system for MU-MIMO transmission according to claim 19, wherein the control circuitry is further configured to:
- for each of the client stations other than the first client station included in the second subset:
  - determine a number of spatial streams of the client station;
  - determine whether a sum of the number of spatial streams allocated to the selected first client station and the number of spatial streams of the client station other than the first client station exceeds a maximum number of allowable spatial streams at the AP; and
  - in response to determining that the sum of spatial streams exceeds the maximum number of permissible spatial streams, remove the client station other than the first client station having the same or larger number of spatial streams as the client station from the second subset.

21. The system for MU-MIMO transmission according to claim 20, wherein the control circuitry is further configured to:
- in response to determining that the sum of spatial streams does not exceed the maximum number of allowable streams:
  - determine whether channel correlation for any of the spatial streams of the client station exceeds a predetermined threshold; and
  - in response to determining that the channel correlation for any of the spatial streams of the client station does not exceed the predetermined threshold: add the client station to a third subset.

22. The system for MU-MIMO transmission according to claim 21, wherein the control circuitry is further configured to:
- determine whether the number of client stations in the third subset exceeds a predetermined number; and
- in response to determining that the number of client stations in the third subset exceeds a predetermined number:
  - select client stations from the third subset to be grouped with the first client station based on the respective channel correlation.

23. The system of claim 13, wherein the power level is based on a received signal strength of the signal received by the particular client station.

24. The system of claim 13, wherein the channel correlation threshold value is the channel correlation of the function which maps to the relative distance between the AP and the selected client station.

* * * * *